US008077714B2

(12) United States Patent
Cremin et al.

(10) Patent No.: US 8,077,714 B2
(45) Date of Patent: Dec. 13, 2011

(54) MAINTENANCE OF BANDWIDTH ALLOCATION FOR TRAFFIC INCLUDING MULTICASTS

(75) Inventors: Con Cremin, Cork (IE); Maurice Gleeson, Barna (IE); Jennifer Hamilton, Cork (IE); Niall Hanrahan, Corrandulla (IE); Micheal Lardner, Galway (IE); Sorcha Callaghan, Cork (IE); Anne G O'Connell, Cork (IE); Eugene G O'Neill, Dublin (IE)

(73) Assignee: Broadcom Corporation, Irvine, CA (US)

( * ) Notice: Subject to any disclaimer, the term of this patent is extended or adjusted under 35 U.S.C. 154(b) by 112 days.

(21) Appl. No.: 12/034,830

(22) Filed: Feb. 21, 2008

(65) Prior Publication Data

US 2008/0253370 A1 Oct. 16, 2008

(51) Int. Cl.
*H04L 12/28* (2006.01)

(52) U.S. Cl. ........................................ 370/390

(58) Field of Classification Search .................. None
See application file for complete search history.

(56) References Cited

U.S. PATENT DOCUMENTS

2004/0042478 A1* 3/2004 Bertagna .................. 370/432
2005/0027782 A1* 2/2005 Jalan et al. ................ 709/200
2005/0083927 A1* 4/2005 Lien et al. ................. 370/389
2005/0207417 A1 9/2005 Ogawa et al.
2006/0104275 A1 5/2006 Dohm
2006/0171407 A1 8/2006 Kim et al.
2007/0053296 A1* 3/2007 Yazaki et al. ............. 370/235

FOREIGN PATENT DOCUMENTS

EP 1 134 933 9/2001
WO 2006/015513 A1 2/2006
WO 2006/052639 5/2006

OTHER PUBLICATIONS

Extended European Search Report received for European Patent Application No. 08250403.6, mailed on Dec. 22, 2010, 6 pages.

* cited by examiner

*Primary Examiner* — Chirag Shah
*Assistant Examiner* — Minh-Trang Nguyen
(74) *Attorney, Agent, or Firm* — Brake Hughes Bellermann LLP

(57) ABSTRACT

Multicast packets that are received on a port of a network device and forwarded to multiple output ports are stored in memory and respective primary control entries which define them are converted to secondary control entries defining multiple unicast packets before a scheduling algorithm is applied. The packets are reconstituted after the application of the scheduling algorithm has been applied to the control entries. For VPLS packets that are received on a single port and replicated multiple times on one or more output ports, a replication database may be used in conjunction with a replication engine to convert the control entry for a received packet into multiple control entries defining unicast packets for each of the destination ports before the scheduling algorithm is applied. This method is applicable to the replication of packets onto a Virtual Private LAN.

13 Claims, 7 Drawing Sheets

MAINTENANCE OF BANDWIDTH ALLOCATION FOR TRAFFIC INCLUDING MULTICASTS

This application claims priority to GB Application No. 0707043.6 filed 12 Apr. 2007, the entire content of which is hereby incorporated by reference.

FIELD OF THE INVENTION

This invention relates to the processing of addressed data packets within a network device and in particular to the provision of 'quality of service' (QoS) in device networking and more particularly to maintaining bandwidth allocation on a port for traffic including multicast packets.

BACKGROUND OF THE INVENTION

In relation to packet-switched networks the term 'quality of service' (QoS) refers to control mechanisms that can provide different priority to different users or data flows, or guarantee a certain level of performance to a data flow in accordance with requests from the application program. Quality of service guarantees are important if the network capacity is limited, especially for real-time streaming multimedia applications. For example, 'voice over IP' and 'IP-TV' require fixed bit rates and may be delay sensitive. Efficient 'fair' scheduling algorithms are applied to provide 'quality of service'. However, the presence of multicast packets can bias the scheduling algorithms and degrade the quality of service.

A typical known network device has a multiplicity of ports for receiving and forwarding packets to and from an external network in accordance with any of a variety of transmission protocols. These ports may be actual but reference herein to 'ports' are intended to include 'virtual' ports because, for example, the device may be used in a LAN which is emulated. Each packet comprises a header and a payload. The header includes the destination address, the source address, the packet type and information from which, among other things, the priority can be ascertained. The payload contains the data to be delivered. When the packet is received it is processed.

There are normally multiple output queues per port. A typical example would be eight queues for each of 128 ports. This allows the device to accord a higher priority to some type of packet and lower priority to other types. It is also customary to allocate 'bandwidth' to each queue for a port. A scheduling algorithm is used to allocate bandwidth between queues on a port.

Packets received on an input port may be unicast packets or multicast packets. For the purpose of the present invention, a unicast packet may be regarded as a packet that will be sent to a single destination port. The received packet may also require replication on one or more ports; an example of such a packet is a VPLS (virtual private LAN service) packet, which is a packet that can be replicated multiple times on a single output port or on multiple output ports.

It is known from US2005/0207417A1 (Ogawa) to perform a two-stage process on received multicast packets. In a first stage, received packets are partioned into separate unicast and multicast queues. In a second stage, packets are read from the multicast queues, stored in a temporary buffer, 'exploded' into unicast packets and put into unicast queues.

US2006/0171407 (Kim) discloses a system in which a forwarding unit has both a unicast forwarder and a multicast forwarder. A multicast packet from the multicast forwader is converted into unicast packets which are reintroduced to the forwarding unit.

These processes are not efficient in terms of memory bandwidth, a important disadvantage in high performance non-blocking archtiectures.

The purpose of the invention is to maintain fair allocation of bandwidth notwithstanding the different type of packet and/or the replication of packets on one or more ports, preferably in a manner which is efficient in terms of memory bandwidth.

SUMMARY OF THE INVENTION

The processing employed in the present invention includes generating for each received packet a control entry which denotes the data packet. The control entry is used to control the flow of the packet through the device and the control entry, rather than the packet itself, which is temporarily stored, is placed eventually on a queue. When a scheduling algorithm selects that control entry, the control entry can be used to retrieve the relevant parts of the packet from memory so as to reconstitute a packet for dispatch to the external network. This process is more efficient in terms of memory than moving whole packets from one memory to another.

Accordingly, control entries denoting multicast packets that are received on a single port and are to be forwarded to multiple output ports may according to the invention be converted to control entries defining multiple unicast packets before the scheduling algorithm is applied. This process is hereafter described as "multicast explosion".

For VPLS or other packets that are received on a single port and replicated multiple times on at least one output port, this invention preferably uses a replication database in conjunction with a replication engine to convert the control entry for a received packet into control entries for multiple unicast packets for each of the destination ports.

When an input port receives a multicast packet which is to be forwarded to multiple output ports, a single identical copy of the packet is sent on a number of destination ports. In this invention the payload contained in the packet is preferably written only once to memory and a control entry that represents the packets is generated. The control entry contains information about the packet; this includes an address pointer to its location in memory and an indication which can be used to determine the ports from which the packet is to be forwarded. Dedicated hardware or software or a combination of hardware and software may then decode the list of destination ports and generate a unique control entry for each packet that must be transmitted. These control entries are exploded into multiple control entries which are written only once into control memory, in separate output queues for each of the destination ports. At this stage the primary control entry denoting a multicast packet has been transformed into a number of secondary control entries that denote unicast packets. These control entries can be scheduled for transmission according to a fair scheduling algorithm, and are used to reconstitute unicast packets for dispatch.

The bandwidth on the output ports is now independent of the source or type of packet as all multicast packets have been in effect converted to unicast packets before the scheduling algorithm is applied.

There follows a description by way of example of several embodiments of the invention with reference to the accompanying drawings.

DETAILED DESCRIPTION

Figure 1:
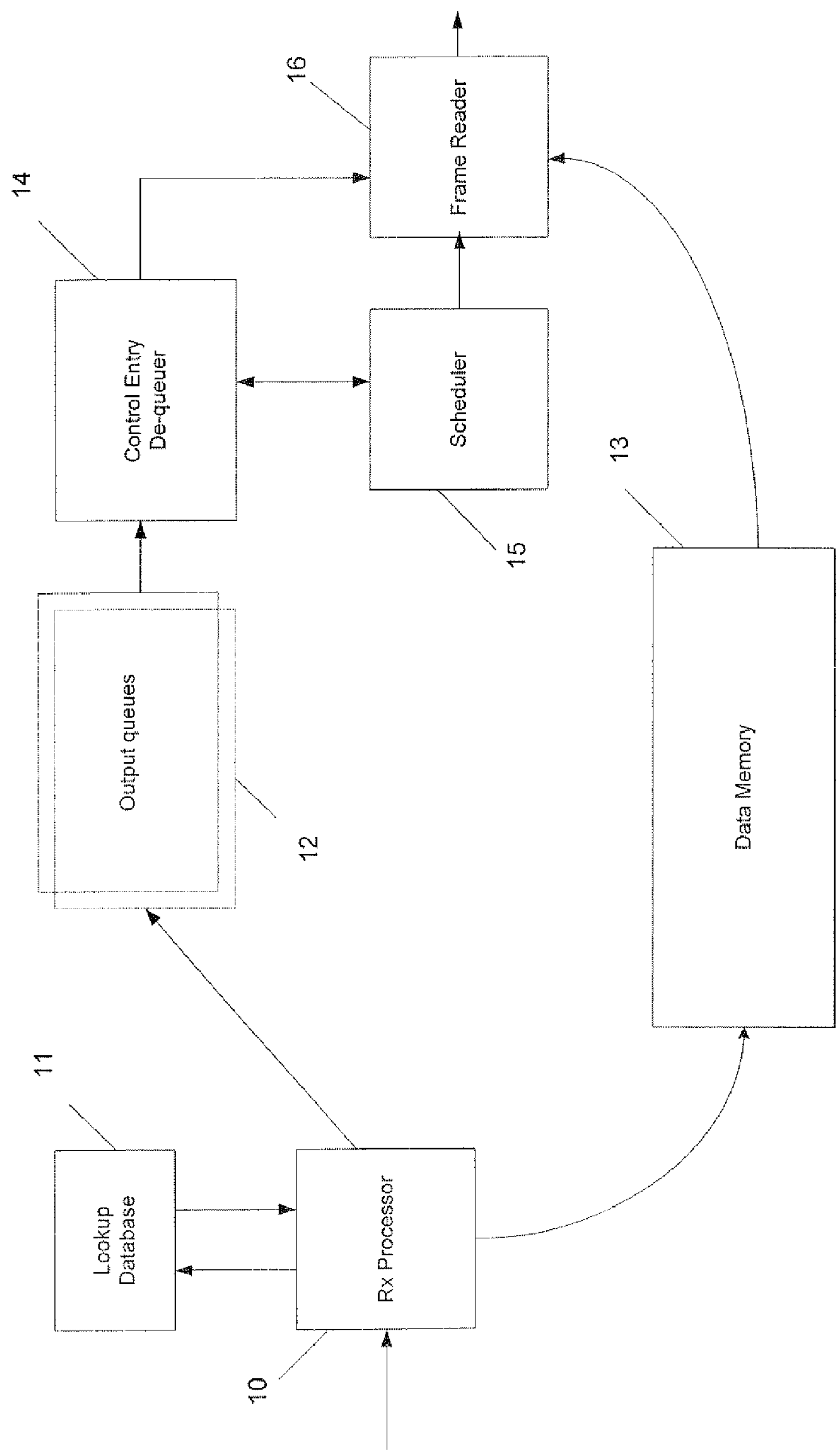
FIG. 1 illustrates schematically a network device and the processing of a packet in a known manner.

A typical network device as employed in a packet-switched network is shown in FIG. 1. Such a device may in general have a multiplicity of ports for receiving packets from, and forwarding packets to, an external network in accordance with any of a variety of transmission protocols. For simplicity FIG. 1 and succeeding Figures show only one source port and one destination port.

Each packet comprises a header and a payload. The header includes the destination address, the source address, the packet type and information from which, among other things, the priority can be ascertained. The packet may conform to any of known protocols. When the packet is received it is processed. This may be a complex operation but for the present purposes it is sufficient to state that the processing, denoted by packet processing stage 10, includes a lookup in a database 11 to obtain forwarding data for the packet. The packet is preferably temporarily stored in data memory 13. The processing obtains a control entry, which is a data set derived from the header and is used to control the flow of the packet through the device. The control entry (or data set) normally includes destination information, which is derived from the network address information during the lookup, protocol identifiers, an identification of the destination port (in the case of a unicast packet) and an address pointer which indicates where the packet is stored in the data memory 13. The control entry is placed on one of the queues 12 defined in control memory. Control entries are selected or de-queued from the control memory by a de-queuer 14 under the control of a scheduler 15. Typically this selects control entries from the output queues in turn for a given port by means of a weighted round robin algorithm. A selected control entry is used by the frame reader to retrieve the respective packet segments from data memory, make such changes (particularly to the header) as may be necessary and reconstitute the packet for dispatch from the respective port.

There are multiple output queues per port, usually for different types of traffic. It is customary to allocate 'bandwidth' to each queue for a port. The scheduling algorithm is used to allocate bandwidth among the queues for a port. If (just for the sake of a simple example) there were four queues each allocated 25% of the bandwidth, the scheduling algorithm could be a simple round robin algorithm; but in practice a weighted algorithm or more complex or versatile algorithm may be used.

Packets received on an input port may be unicast packets or multicast packets. For the purpose of the present invention, a unicast packet may be regarded as a packet that will be sent to a single destination. Multicast packets may be regarded as packets that will be sent to more than one destination. A VPLS (virtual private LAN service) packet is a multicast packet that can be replicated multiple times on a single port or multiple output ports. Maintaining fair scheduling in the presence of these different types of packet, to maintain 'quality of service', is one object of the invention.

The main basis of the invention is to expand or explode the control entries that denote multicast packets so that they are all converted to entries that in effect denote unicast packets before they are selected by the scheduling algorithm. As will be seen, where a multicast packet has to be sent to different ports, a respective 'secondary' control entry will be placed on a respective output queue. If such an entry does not require replication, it is treated just as if it denoted an ordinary unicast packet. If it requires replication on a given port, it is treated (as will be described) as if it were a succession of distinct unicast packets. In either event, the scheduling algorithm can operate just as if it were operated for packets that were all unicast and accordingly the allocation of bandwidth will not be distorted by the presence of multicast packets.

Before a particular embodiment of the invention is described, reference will first be made to FIG. 6 which shows in simplified form (omitting some fields not relevant to the invention) a control entry 60 for use in the present invention.

Many of the fields in the control entry are derived from the packet. The format of some fields is determined by the practical advantages in employing 'indirection'. For example, owing to the large number of ports (typically 128) it is inefficient for the control entry to contain directly a port bit mask. Thus it preferably contains an indication of the ports by means of a field that maps to an entry in a table from which the port bit mask may be obtained. The same applies to a field which is used to access an entry in a table that indicates how many times a packet should be replicated.

Figure 6:
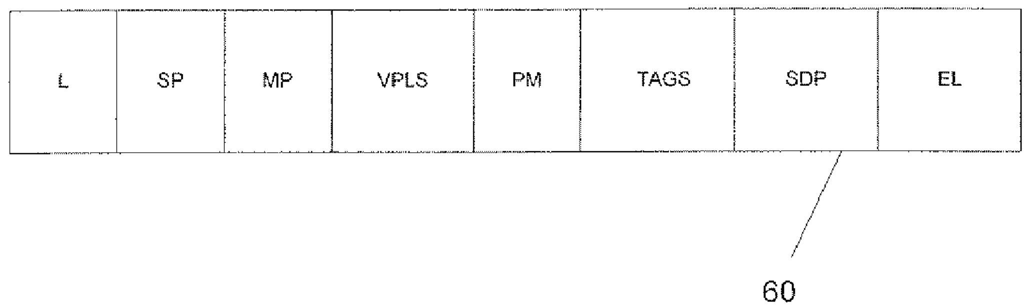
FIG. 6 is a simplified illustration of a control entry.

The example in FIG. 6 comprises a first field L, which denotes the size of the packet, and a field SP, which refers to customary service parameters. These may include default unicast and multicast flood maps. Next is a memory pointer MP, which points to the location in data memory 13 where the packet is stored while the control entry is processed and from which it will be retrieved when the control entry has finally been de-queued. Field VPLS contains flags for identifying the packet as a VPLS packet and a field which is used in conjunction with a replication database (to be described) to determine the number of replications of a packet for a given port. Field PM indicates directly or indirectly the port or ports from which one or more instances of the packet is to be forwarded. It will map to a port bit mask. The next field (TAGS) comprises various tags of no direct bearing on the invention. The next field MC is a multicast field which will map to an entry in a multicast table, as will be described. The field SDP (single destination port) indicates whether the packet is going to a single destination port or to multiple destinations, and is used to decode the PM field. If SDP=1, then the field PM contains the destination port. If SDP=0 then PM contains a multicast 'handle' which is subsequently used to read a multicast table to derive a list of destinations. The next field EL indicates whether the packet is an 'elan' packet, transmitted over an emulated LAN, or an 'eline' packet, transmitted over an emulated point-to-point connection.

Figure 2:
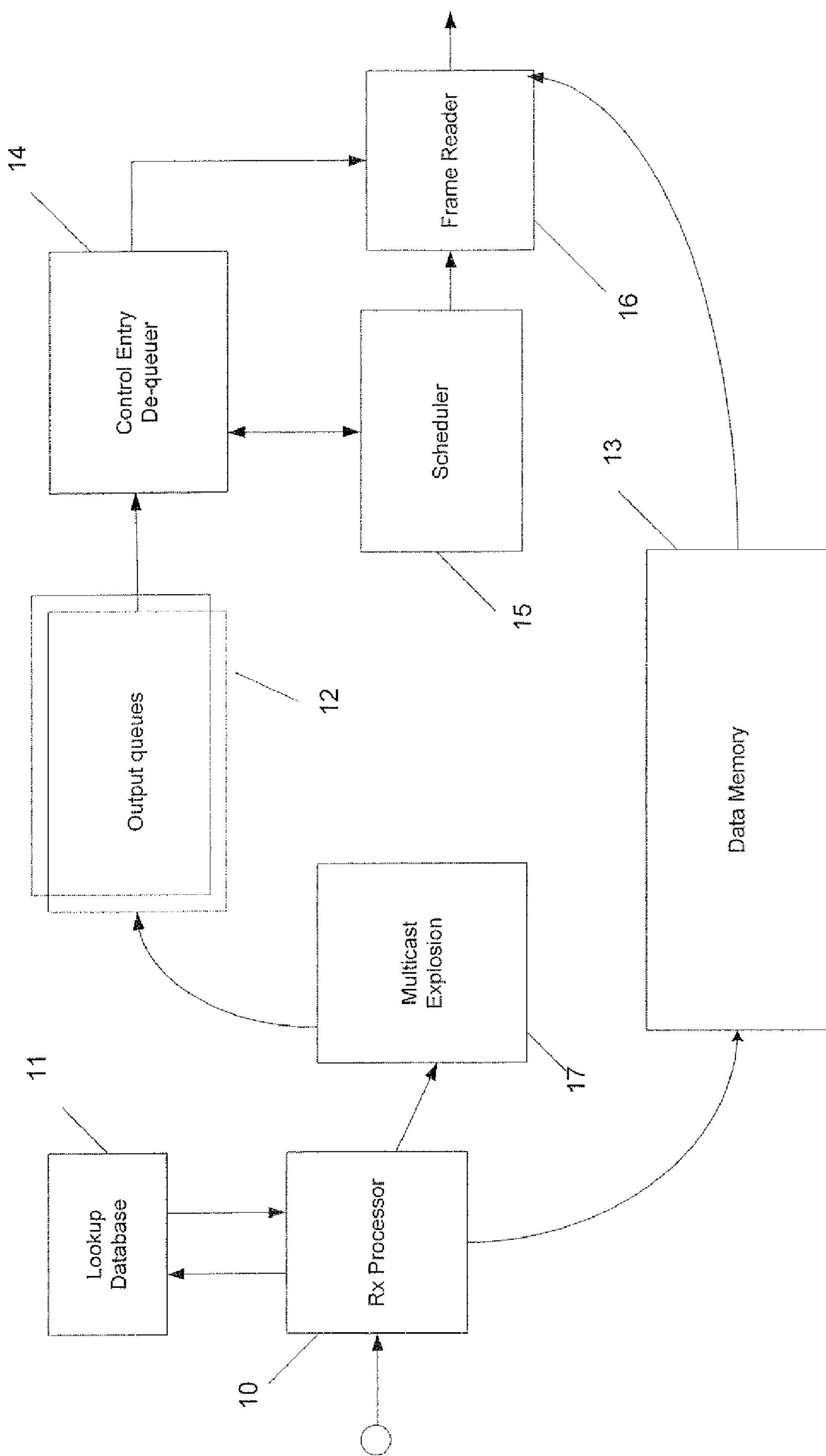
FIG. 2 illustrates one example of the invention in relation to the network device shown in FIG. 1.

FIG. 2 illustrates one embodiment of the invention. This embodiment has generally the same stages as shown in the example of FIG. 1. However, interposed between the Rx Process stage 10 and the output queues is a stage 17 captioned 'Multicast Explosion'. For simplicity FIG. 2 omits any replication of packets.

Stage 17, which may be constituted by dedicated hardware or software or a combination of hardware and software, then decodes the SDP flag. If this flag is 'clear', stage 17 uses the PM field to lookup a list of destinations and then copies the control entry into the relevant queue 12 for each of the destinations. These control entries may be regarded as 'secondary control entries', which generally resemble the primary control entry but will denote a unicast packet. These secondary control entries will contain the same address pointer for memory 13, so that the frame reader 16 will retrieve for each of them the same payload. These control entries are then written into separate output queues 12 for each of the destination ports. These entries are then scheduled for transmission according to a scheduling algorithm such as a deficit-weighted round robin algorithm. The scheduler 15 controls the de-queueing stage 14 to select the control entries from the queues for the port in accordance with the scheduling algorithm and the control entries are passed one at a time to the frame reader 16, which in accordance with the respective address pointer retrieves the respective payload from the data memory 13 and reconstitutes each unicast packet for dispatch from the respective port.

The allocation of bandwidth on the output ports is now independent of the source or type of packet because all multicast packets have been converted to unicast packets before the scheduling algorithm is applied.

When a VPLS (Virtual private LAN Service) packet has been received it must be replicated either multiple times for a single destination port or multiple times for multiple destination ports. Different header labels must be attached with each replication. The control entry for this packet indicates that the packet is to be sent to a port or to multiple ports. Furthermore, the VPLS field indicates that the packet may be replicated on this port or these ports but does not (in this embodiment) indicate the number of replications required and does not contain the labels to be appended. The number and size of the labels to be appended are large and they have to be stored in a separate database. The replication takes place within the output de-queueing process. These labels are appended to the packets as the packets are being transmitted.

In order to maintain fair scheduling and manage the bandwidth on a port, the number of replications must be known and taken into account in the scheduling algorithm.

Figure 3:
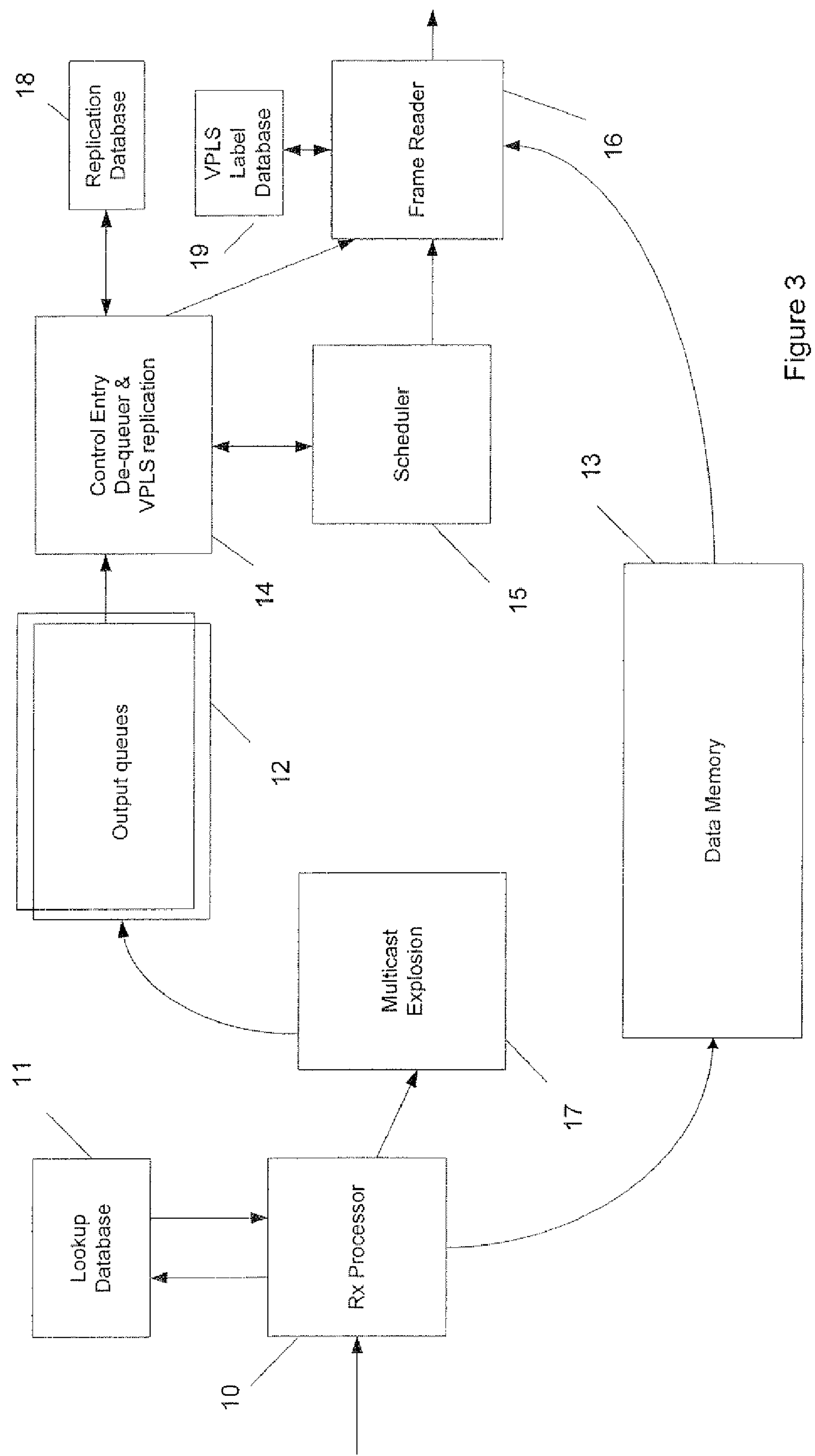
FIG. 3 illustrates another example of the invention.

FIG. 3 illustrates an embodiment generally similar to that shown in FIG. 2. When a packet is received, it is parsed and a lookup of the forwarding database 11 is done. The lookup result indicates that the packet may require VPLS replication. A single control entry is generated for each port (which may be one or more) and this control entry is stored in the respective output queue as before. However, when the control entry is due for de-queuing, the VPLS field is used to access a replication database 18. If this database returns an indication that only one instance is required, the control entry is cleared for the queues and the packet is reconstituted as previously described. If however multiple replications are required, the de-queuer 14 will start a decrementing counter. An instance of the control entry will be passed to the frame reader 16 to reconstitute a unicast packet with the relevant header (modified as necessary) and the payload, but the control entry will remain at the head of its queue to await the next time that queue is selected according to the scheduling algorithm. This sub-process is repeated until all the replications have been made and the counter reaches zero. Then the de-queuer 14 will clear the control entry from its queue. For VPLS packets, which require the aforementioned labels, the frame reader 16 will, while the control entry is being used to retrieve the packet data from the memory 13, access the VPLS label database 19 so that the required labels may be appended to the packet.

Thus the scheduler 15 processes the control entries in a similar fashion to control entries that would have been generated from unicast packets. Consequently, the bandwidth allocated to the queues is independent of the type or number of VPLS replications.

Figure 4:
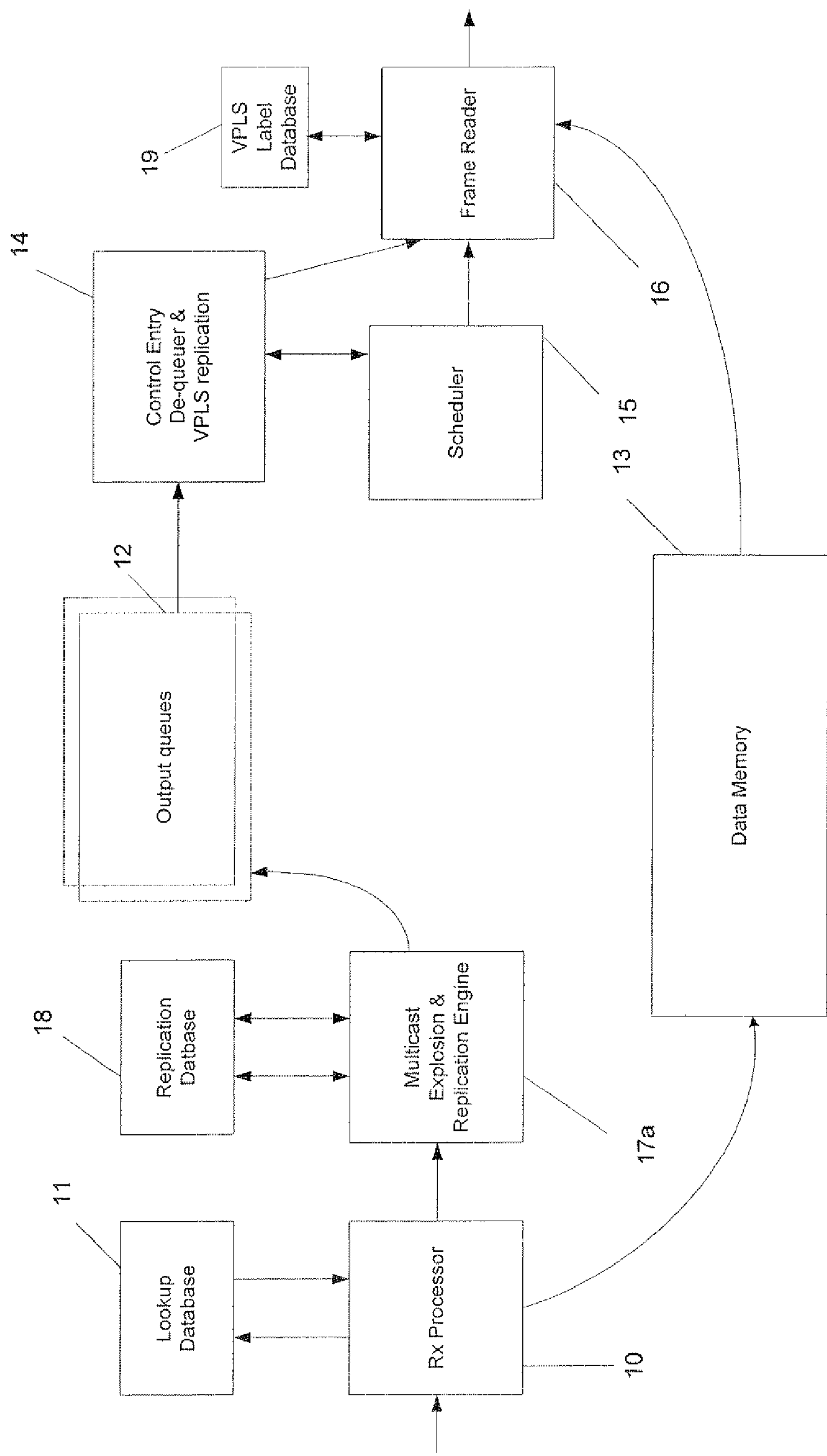
FIG. 4 illustrates yet another example of the invention.

FIG. 4 illustrates another embodiment which employs an alternative scheme for VPLS replication. A single process combines the multicast explosion and the VPLS replication per port.

In the embodiment shown in FIG. 4, a received packet is parsed in Rx Process 10 and a lookup of the forwarding database 11 is made. The lookup result indicates the destination ports and that the packet requires VPLS replication. A single control entry is generated. The control entry is then read by the VPLS replication engine 17*a*. This engine reads the control entry, determines the destination ports and for each port it accesses the replication database to determine the number of replications. The engine replicates the primary control entry into one or more multiple unicast control entries for each destination port as required. The scheduler 15 controls the de-queuer 14 to select the replicated control entries as if they were unicast entries in accordance with the scheduling algorithm and outputs in succession single control entries each with a single destination.

The bandwidth on the output ports is now independent of the source or type of packet as all multicast packets have been converted to unicast packets before the scheduling algorithm is applied.

Figure 5A:
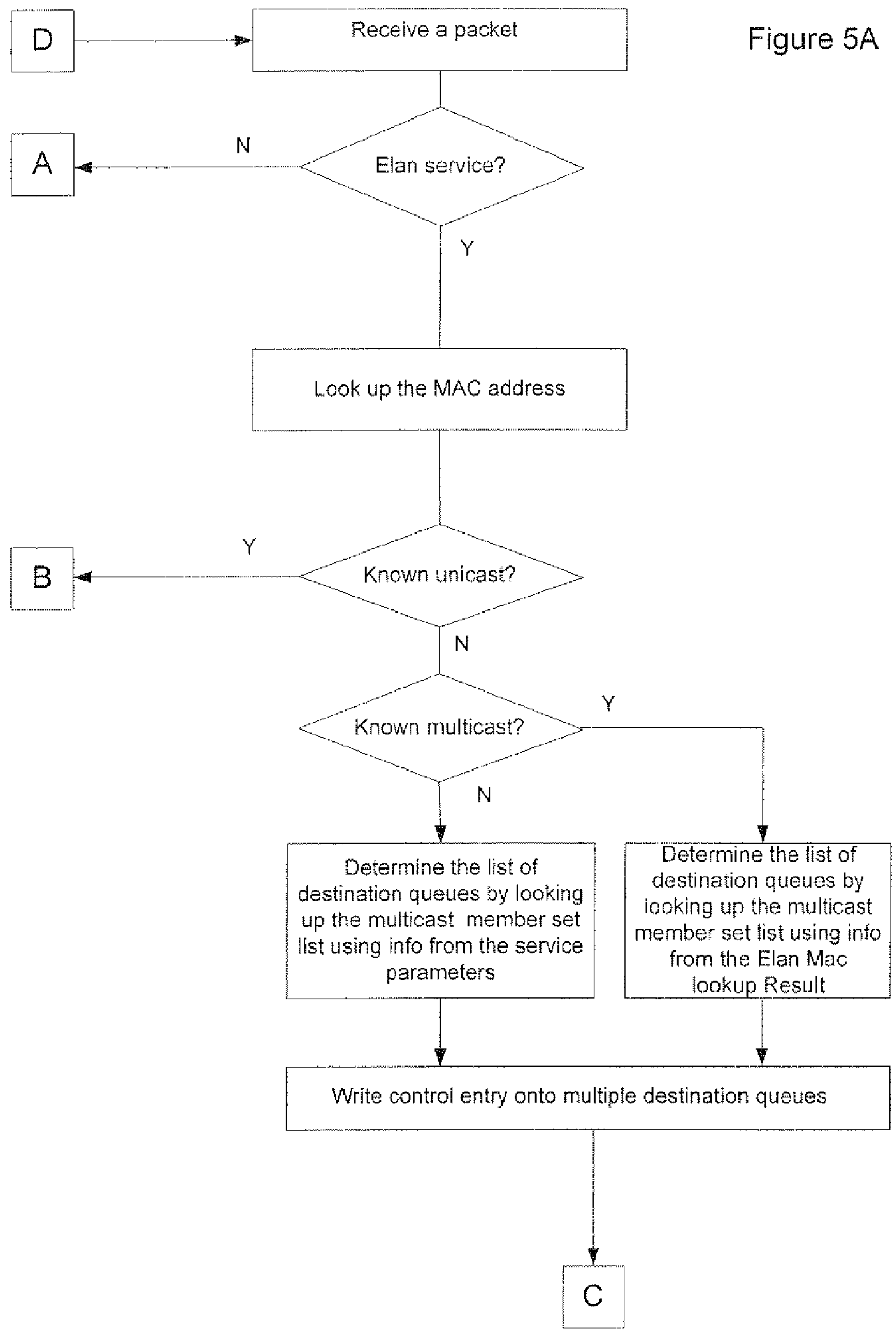
FIGS. 5A and 5B together are a flow diagram illustrating a preferred manner of operation according to the invention.
Figure 5B:
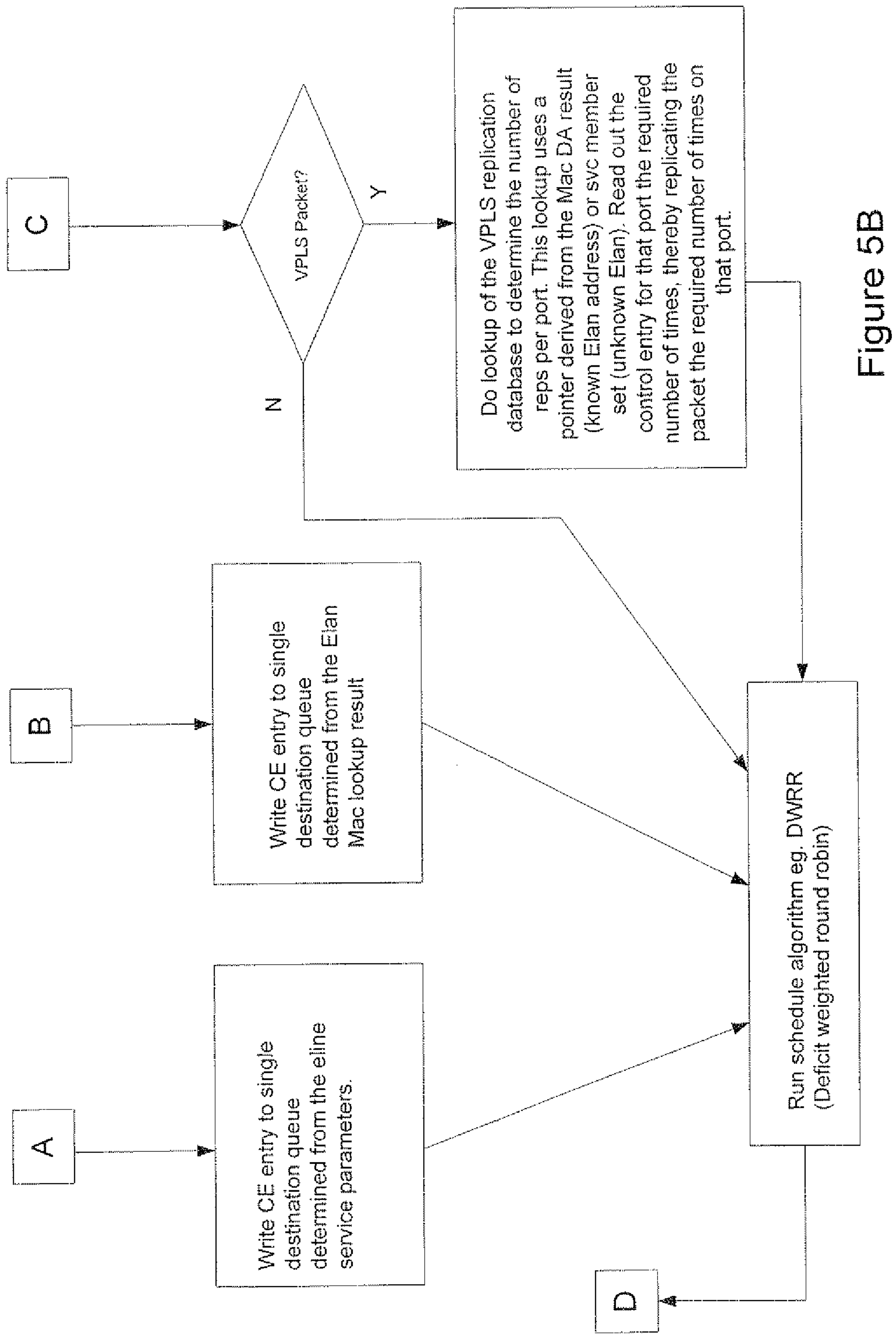

FIGS. 5A and 5B summarise the processing of a packet in accordance with FIG. 3.

On reception of a packet there is a determination whether it is an elan service packet. If it is not, a control entry is written to a single destination queue and subjected to the scheduling algorithm as described above. If it is, there is a look-up in the forwarding database for the MAC address. If it is a known unicast a single control entry is generated and sent to a single destination queue as before. If it is not a known multicast (i.e. the destination ports are unknown), then a list of destination queues is obtained from the service parameters and a multiplicity of control entries are written to destination queues. Alternatively, if the multicast is known the multicast handle will be specified in the MAC DA look-up database 11 and the list of destination queues will be obtained from the multicast explosion. In either case the multicast is 'exploded' into unicasts each denoted by a respective control entry and these control entries are written to the destination queues.

If the packet is a VPLS packet or otherwise requires replication, a lookup of the VPLS replication database is required to determine the number of replications per port. This lookup uses a pointer from either the MAC DA result (for a known address) or from the service parameters (for unknown address) The control entry is read out the required number of times.

The invention claimed is:

1. A method comprising:

receiving a multicast packet;

storing at least a payload of the received multicast packet in memory;

determining a primary control entry for the received multicast packet, the primary control entry denoting a multicast packet;

converting the primary control entry into a plurality of secondary control entries by copying at least a portion of the primary control entry into an output queue for each of a plurality of destination ports for the packet, each of the secondary control entries denoting a unicast packet and including a pointer to a location in memory where the payload of the received packet is stored;

dequeueing each secondary control entry, under control of a scheduler;

reconstituting for transmission a unicast packet associated with each secondary control entry based on the dequeued secondary control entry and the packet payload; and wherein each secondary control entry includes a replication field indicating whether or not packet replication is to be performed.

2. The method of claim 1 and further comprising:

performing a lookup in a forwarding database based on the received multicast packet to determine whether or not the received packet requires Virtual Private Lan Service (VPLS) replication or not.

3. The method of claim 1 wherein the replication field of each secondary control entry is a Virtual Private LAN Service (VPLS) field.

4. The method of claim 1 and further comprising replicating the packet one or more times, based on the secondary control entry and the packet payload, if the replication field indicates that replication is to be performed.

5. The method of claim 1 wherein each secondary control entry includes a replication field, the method further comprising performing the following if the replication field of a secondary control entry indicates that packet replication should be performed for the secondary control entry and the port:

wherein the dequeueing further comprises determining a number of replications required for a control entry for a port based on the replication field for the control entry; and wherein the reconstituting further comprises performing the following for each of one or more replications for the number of replications: obtaining an instance of the secondary control entry, and reconstituting the unicast packet based on the instance of the secondary control entry and the stored packet payload.

6. An apparatus comprising:

a packet processing stage configured to receive a multicast packet and to store at least a payload of the received multicast packet in a data memory, and to determine a primary control entry for the received multicast packet, the primary control entry denoting a multicast packet;

a plurality of output queues, at least one output queue being provided for each of a plurality of ports;

a multicast explosion stage that is configured to determine one or more destinations for the multicast packet, and to convert the primary control entry for the received packet into a plurality of secondary control entries by copying at least a portion of the primary control entry into an output queue for each of a plurality of destination ports for the packet, each of the secondary control entries denoting a unicast packet and including a pointer to a location in the memory where the payload of the received packet is stored, each secondary control entry also including a replication field that indicates whether or not packet replication is to be performed for the control entry;

a control entry dequeuer configured to dequeue selected secondary control entries in accordance with a scheduling algorithm; and a frame reader coupled to the control entry dequeuer and data memory, the frame reader configured to receive a dequeued secondary control entry and receive a respective payload and reconstitute a unicast packet for dispatch from the respective destination port based on the received secondary control entry and the respective payload.

7. The apparatus of claim 6 wherein the control entry dequeuer is further configured to determine, based on a replication field for a secondary control entry, that packet replication is to be performed for the control entry for a port, determine a number of packet replications for the port, and output an instance of the control entry to the frame reader for each packet replication that is to be performed to cause the frame reader to reconstitute the unicast packet a required number of instances for transmission from the port.

8. The apparatus of claim 6 wherein the replication field includes a VPLS (Virtual Private Lan Service) field that indicates whether VPLS replication is required for the packet.

9. An apparatus comprising:

a processor; and a memory;

the processor configured to:

receive a multicast packet;

store at least a payload of the received multicast packet in the memory;

determine a primary control entry for the received multicast packet, the primary control entry denoting a multicast packet;

convert the primary control entry into a plurality of secondary control entries by copying at least a portion of the primary control entry into an output queue for each of a plurality of destination ports for the packet, each of the secondary control entries denoting a unicast packet and including a pointer to a location in the memory where the payload of the received packet is stored;

dequeue each secondary control entry, under control of a scheduler;

reconstitute for transmission a unicast packet associated with each secondary control entry based on the dequeued secondary control entry and the packet payload; and wherein each secondary control entry includes a replication field indicating whether or not packet replication is to be performed.

10. The apparatus of claim 9 and wherein the processor is further configured to:

perform a lookup in a forwarding database based stored in the memory on the received multicast packet to determine whether or not the received packet requires Virtual Private LAN Service (VPLS) replication or not.

11. The apparatus of claim 9 wherein the replication field of each secondary control entry is a Virtual Private LAN Service (VPLS) field.

12. The apparatus of claim 9 wherein the processor is further configured to replicate the packet one or more times, based on the secondary control entry and the packet payload, if the replication field indicates that replication is to be performed.

13. The apparatus of claim 9 wherein each secondary control entry includes a replication field, the processor further configured to perform the following if the replication field of a secondary control entry indicates that packet replication should be performed for the secondary control entry and the port:

wherein the processor being configured to dequeue further comprises the processor being configured to determine a number of replications required for a control entry for a port based on the replication field for the control entry; and wherein the processor being configured to reconstitute further comprises the processor being configured to perform the following for each of one or more replications for the number of replications: obtain an instance of the secondary control entry, and reconstitute the unicast packet based on the instance of the secondary control entry and the stored packet payload.

* * * * *

UNITED STATES PATENT AND TRADEMARK OFFICE

CERTIFICATE OF CORRECTION

PATENT NO. : 8,077,714 B2
APPLICATION NO. : 12/034830
DATED : December 13, 2011
INVENTOR(S) : Con Cremin et al.

It is certified that error appears in the above-identified patent and that said Letters Patent is hereby corrected as shown below:

On Title page, field 30, in column 1, line 1 Above "(51) Int. Cl."
insert
--(30) Foreign Application Priority Data
Apr. 12, 2007 (GB)..................... 0707043.6--

Signed and Sealed this
Fourteenth Day of February, 2012

David J. Kappos
*Director of the United States Patent and Trademark Office*